Sept. 27, 1955　　　　M. J. DIAMOND　　　　2,719,224
INDUCTION SWITCHING MEANS
Filed April 1, 1950

Inventor
Milton J. Diamond
By Willits, Helmig & Baillio
Attorneys

United States Patent Office 2,719,224
Patented Sept. 27, 1955

2,719,224

INDUCTION SWITCHING MEANS

Milton J. Diamond, Saginaw, Mich., assignor to General Motors Corporation, Detroit, Mich., a corporation of Delaware Application April 1, 1950, Serial No. 153,417

5 Claims. (Cl. 250—27)

This invention relates to means for testing characteristics of physical parts and more particularly to means for magnetically testing parts for hardness. There is disclosed in my co-pending application S. N. 95,900, filed May 28, 1949, which matured into Patent No. 2,647,628, a device for magnetically testing production parts for hardness. In brief, that device operates on the principles of magnetizing a part to be tested above the saturation point, removing the magnetizing field and measuring the residual magnetism remaining in the part, the residual magnetism remaining after a predetermined time being directly proportional to the hardness thereof. Since the device is fully automatic and starts operation upon the introduction of a part thereto to be tested, an initiating means is provided to start the mechanism through its cycle when the part was placed therein. In my co-pending application above referred to the initiating or triggering system consisted of a photocell and a source of light across the path of the entering part to be actuated by the movement of the part past that station. However, it has been found that such means required considerable service in that the accumulation of dirt on the photocell and in the light path cut down the sensitivity in a relatively short time and caused the device to stop operating.

It is therefore an object of my invention to provide an initiating means for automatic test equipment which will not be affected by accumulations of dirt.

It is a still further object of my invention to provide initiating means for test equipment which is reliable, rugged and requires a minimum of service.

It is a still further object of my invention to provide an initiating system for testing means which is easily adjusted to accommodate varying situations.

With these and other objects in view which will become apparent as the specification proceeds, my invention will be best understood by reference to the following specification and claims and the illustrations in the accompanying drawings, in which:

Figure 1:
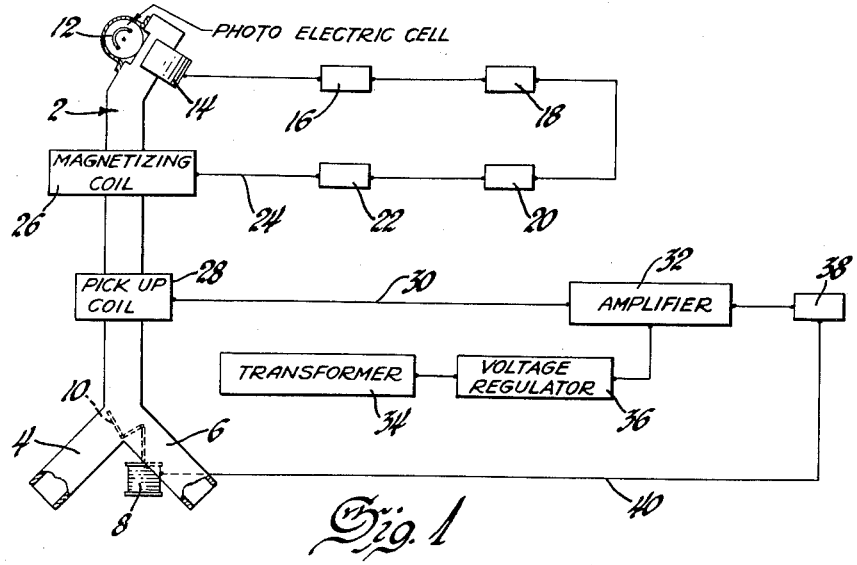
Figure 1 is a schematic block diagram illustrating the complete test device, as disclosed in my prior application.

Referring now more specifically to Figure 1, there is shown therein a hollow tube 2 through which parts to be tested are dropped by introducing them at the upper end thereof and having them fall through the tube to be distributed through the different channels 4 and 6 at the bottom, depending upon the energization of the relay 8, which controls the position of the shutter 10. In that instance a source of light 12 was provided on one side of the hollow tube and light from this source was directed upon a photocell 14 on the opposite side. The output of the photocell is connected to a first control relay 16 and in turn to other control relays 18, 20, and 22, the latter being directly connected through line 24 to a very strong magnetizing coil 26 mounted around the tube 2. As the part falls past the triggering photoelectric cell it, through the control relay system, causes energization of the magnetizing coil 26, this coil having sufficient strength to stop the part from further falling momentarily and magnetizing it above the saturation point.

Upon release of the part from the magnetizing coil through the further operation of the control relays (not shown in detail), the part continues to drop through tube 2 and through the pick-up coil 28. The pick-up coil is directly connected through line 30 with an amplifier section 32 which is supplied with power from a transformer 34 and a voltage regulator 36. The output of the amplifier is connected through a control relay 38 directly to selector gate solenoid 8 through line 40. Thus, depending upon the amount of energy generated in the pick-up coil 28 by the part as it moves therethrough, the solenoid 8 will be operated or non-operated to divert the part into the proper bin which its hardness or residual magnetism retentivity dictates.

Figure 2:
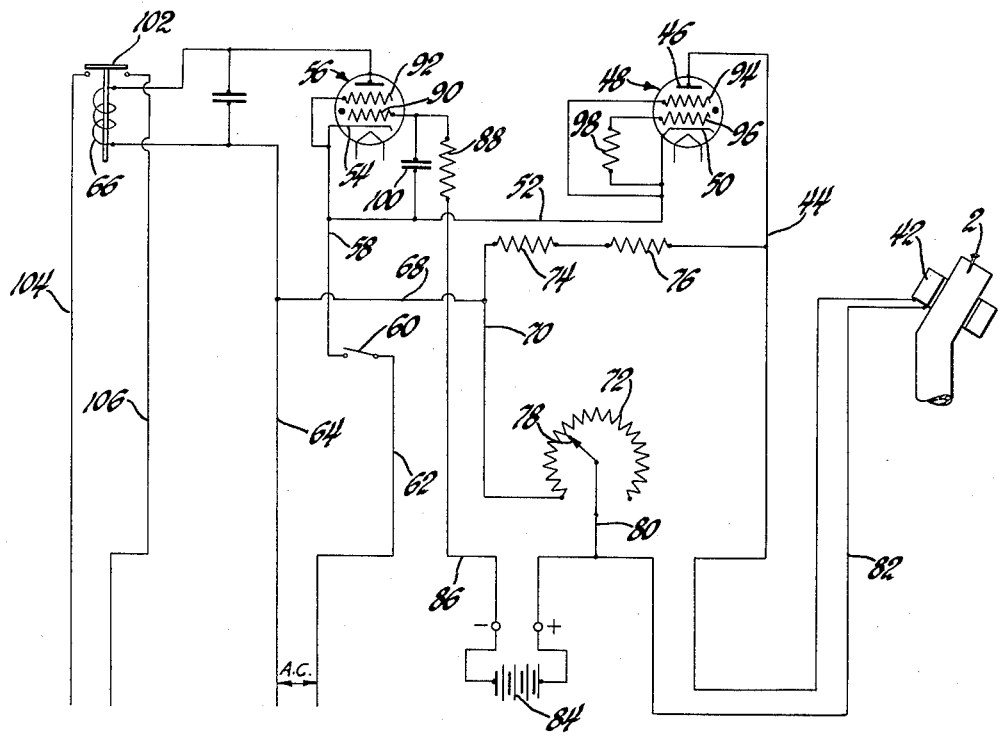
Figure 2 is a schematic circuit diagram of the new initiating circuit of the present invention.

As mentioned above, it has been found that in the operation of the above system, which is specifically described in my co-pending application, that since this equipment is generally operated in factory areas in which the precipitation of dirt is rather high, the photocell system shortly became dirty and inoperative and required cleaning. The trigger system of Figure 2 was, therefore, devised to substitute for the photocell system, and in that instance there is shown in Figure 2 the same guiding tube 2, in this case having its upper end surrounded by a toroidal coil 42. One lead 44 of the coil is connected to the plate 46 of an electronic vacuum tube 48, the cathode 50 being connected through line 52 with the cathode 54 of a second electronic tube 56. The cathode 54 is also connected through line 58 to a manual switch 60 and thence through line 62 to a suitable source of power for the system. The opposite power lead 64 is directly connected to one side of a magnetic operating relay coil 66 and also to a tie line 68 extending to a further conductor 70.

Conductor 70 interconnects one end of a variable resistance rheostat 72 and a fixed resistor 74, the opposite terminal of resistor 74 being connected to a series resistor 76 and thence to line 44. A variable tap 78 on the rheostat 72 is connected to conductor 80 and thence to conductor 82 which extends from a terminal of the pick-up coil 42 to the positive side of a D. C. voltage supply such as battery 84. The negative side of said battery is connected through line 86 to resistor 88 and then to biasing grid 90 of the tube 56. A grid 92 of the tube 56 is directly connected to the cathode 54. In like manner, grid 94 of tube 48 is directly connected to cathode 50 and grid 96 of the same tube is connected through resistor 98 with the cathode 50. A condenser 100 is connected between line 52 and grid 90. Solenoid coil 66 actuates an armature 102 in a control circuit consisting of lines 104 and 106 which extend to the control relays of the general system as indicated in Figure 1.

The two tubes 48 and 56 may, for example, be of the type known as thyratrons. In the operation, the power for operating the system is supplied both through lines 62—64, which is the A. C. power and may be of the order of 110 volts, and the battery 84, the battery providing a biasing potential of varying degree, depending upon the setting of rheostat 72—78, which is determined by the particular application. As the article to be tested is dropped through tube 2 the impedance of coil 42 is momentarily changed, which changes the inductance in the plate circuit of thyratron tube 48, causing this tube to trigger and in turn varying the bias on the first tube 56 and causing that tube to conduct to energize relay coil 66 to attract its armature and close the control line 104—106, which starts the timing system for the magnetizing coil.

I claim:
1. In triggering means to be actuated by the passage of a plurality of individual parts in sequence, a defined path for the passage of parts, an impedance mounted adjacent the path at a prescribed station whose value will be varied by the passage of parts, an electronic tube having at least a cathode, control grid and plate, the plate being connected to the impedance means, a source of direct current power, variable resistance means connected between the source of power and the plate, a second electronic tube having a cathode, grid and plate, a source of alternating current, means connecting the two tubes across the alternating current source in parallel and control means connected in the plate circuit of the second tube so that upon conductance of the second tube due to a variation in the impedance in the plate circuit of the first, the control means will be energized.

2. In control means, a plurality of multielement electron tubes, a source of alternating current, means for connecting said tubes in parallel across the alternating current source, control means in the output of one of the tubes, impedance means so arranged that the value thereof is varied by the relative proximity of foreign bodies connected in the output of the second tube and direct current biasing means connected to the output circuits of the tubes so that upon a variation in the impedance value the tube in whose output the impedance is connected will conduct to change the bias on the other tube to cause it to conduct and operate the control means.

3. In control means, a pair of electron tubes having at least a cathode, anode and control electrode, a source of alternating current, means for connecting the cathodes to one side of the alternating current source and the anodes to the other side so the two will be in parallel relation, impedance means in the anode circuit of one of the tubes so arranged that its value is altered by the relative proximity of metallic bodies, control means connected in the anode circuit of the other tube, direct current biasing means connected to the anodes of the tubes to bias the same to conduct at predetermined points so that upon a change in the impedance in the anode circuit of the first tube that tube will conduct, changing the bias on the second tube to cause that to conduct and the control means to be actuated.

4. In control means, a source of alternating current, a pair of gas filled electron tubes connected in parallel across said alternating current source, biasing means connected to the output circuits of said tubes, adjustable direct current means connected to the biasing means to provide control therefor, control means connected in the output of one of the tubes, impedance means so arranged that its value is varied by the relative proximity of metallic bodies connected in the output of the other tube so that with both tubes biased to a nonconductive state a change in the impedance value will cause the tube connected thereto to conduct, changing the bias on the other tube so that it becomes conductive and energizes the control means.

5. In triggering means to be actuated by the passage of a part past a predetermined point, an electrical impedance element mounted at said point whose value is affected by the passage of the part, a plurality of electron tubes, a source of alternating current, means connecting said tubes in parallel across the alternating current source, said impedance being connected in the output circuit of one of the tubes, control means connected in the output of the other tube, direct current biasing means connected to the output circuits of the tubes and means for adjusting said bias so that changes in the impedance caused by the passage of parts will cause the tube connected thereto to conduct, changing the bias on the other tube, which will then conduct to energize the control means.

References Cited in the file of this patent
UNITED STATES PATENTS

| Number | Name | Date |
|---|---|---|
| 2,045,769 | Geffcken | June 30, 1936 |
| 2,095,124 | Cockrell | Oct. 5, 1937 |
| 2,150,430 | Drenkard | Mar. 14, 1939 |
| 2,150,440 | Hargreaves | Mar. 14, 1939 |
| 2,444,751 | Scott | July 6, 1948 |
| 2,589,214 | Andrews | Mar. 18, 1952 |